United States Patent [19]
Kiggens et al.

[11] Patent Number: 5,671,400
[45] Date of Patent: Sep. 23, 1997

[54] PROGRAMMABLE BUS INTERFACE UNIT DATA PATH

[75] Inventors: Jill Marie Kiggens, Temecula; Teresa Mary Affeldt, Lake Forest, both of Calif.

[73] Assignee: Unisys Corporation, Blue Bell, Pa.

[21] Appl. No.: 515,605

[22] Filed: Aug. 16, 1995

[51] Int. Cl.$^6$ ........................................................ G06F 5/06
[52] U.S. Cl. ........................ 395/500; 395/250; 364/239.1; 364/DIG. 1; 364/939.4; 364/DIG. 2
[58] Field of Search ................................ 395/500, 250, 395/275, 308; 364/900 MS File, 200 MS File; 179/15 BS; 375/118; 326/45; 371/22.3; 348/222; 341/61

[56] References Cited

U.S. PATENT DOCUMENTS

| | | | |
|---|---|---|---|
| 3,984,641 | 10/1976 | Ruyter | 179/15 BS |
| 4,158,235 | 6/1979 | Call et al. | 364/900 |
| 4,607,345 | 8/1986 | Mehta | 364/900 |
| 5,020,081 | 5/1991 | Allen et al. | 375/118 |
| 5,179,667 | 1/1993 | Iyer | 395/275 |
| 5,367,209 | 11/1994 | Hauck et al. | 326/45 |
| 5,381,420 | 1/1995 | Henry | 371/22.3 |
| 5,386,517 | 1/1995 | Sheth et al. | 395/275 |
| 5,408,266 | 4/1995 | Ikeyama et al. | 348/222 |
| 5,444,860 | 8/1995 | Datwyler et al. | 395/500 |
| 5,499,344 | 3/1996 | Elnashar et al. | 395/250 |
| 5,509,127 | 4/1996 | Datwyler et al. | 395/308 |
| 5,512,894 | 4/1996 | Ikeyama et al. | 341/61 |

OTHER PUBLICATIONS

"Muilti–Rate Transformation of Directional Affine Recurrence Equations", by Y. Zheng et al.,IEEE, Application Specific Array Processors, 1993 Int'l. Conference, Aug. 1993, pp. 392–403.

"A 2.5 Gb/s GaAs ATM Mux Demux AAIC", by J. Madsen et al., IEEE, GaAs IC Symposium 1995, pp. 43–46.

"A 2.5 Gb/s ATM Add–Drop Unit for B–ISDN Based on a GaAs LSI", by J. Madsen et al., IEEE Journal of Solid–State Circuits, vol. 31, No. 10, Oct. 1996, pp. 1400–1405.

*Primary Examiner*—Kevin J. Teska
*Assistant Examiner*—Russell W. Frejd
*Attorney, Agent, or Firm*—Alfred W. Kozak; Mark T. Starr; Steven R. Petersen

[57] ABSTRACT

A field programmable gate array circuit device provides a bus interface data path between a processor and system bus, each of which operates at a different data transfer protocol at a different clock rate. The bus interface unit controls the transfer of data to and from a system bus which is connected to a main memory module, an I/O module or other modules, such as an external CPM module. Data passing from various modules to the processor or from the processor to various modules can operate in one word or four-word blocks. Additionally, intermodule communication is managed by message words, which message words are operative in groups of four words as a block. A transfer logic box holds a plurality of (i) Request words (ii) Acknowledgement words for conveyance to the processor from external modules. These message words arrive from the system bus at the system bus clock rate but are then transferred to the processor through a data queue means at the processor clock rate on a single word basis other than a block basis. The bus interface unit data path eliminates all timing delay and interconnection difficulties that formally occurred. Since the present system, all of the interface circuitry is included in a single or a double field programmable gate array.

4 Claims, 10 Drawing Sheets

PROGRAMMABLE BUS INTERFACE UNIT DATA PATH

FIELD OF THE INVENTION

This disclosure relates to improved programmable interface systems between a processor and a system bus.

BACKGROUND OF THE INVENTION

In earlier computer systems, the connection between the Central Processing Module and its processor unit over to a system bus provided data paths which had programmable devices and discreet RAMs. Due to the large number of board crossings between devices, this type of approach reduced reliability and the performance of the system. Alternatively, the use of a custom Application Specific Integrated Circuit (ASIC) is less cost effective and has a higher design cycle time together with a higher risk and less flexibility of alternative operations.

The present system and method is capable of providing a programmable data path between a processor and system bus without the need for discrete RAMs and programmable devices by allowing for higher reliability, greater performance and more flexibility of operating conditions.

Another area of flexibility is the provision for compatibility of the processor system which works at a first frequency and a first protocol to the use of a system bus which works at a second frequency and a second protocol.

This system is related to U.S. Pat. 5,444,860 entitled "Translator System for Message Transfers between Digital Units Operating on Different Clock Rates" which is included herein by reference. This U.S. Patent is commonly owned by the same assignee as this application.

SUMMARY OF THE INVENTION

The present system provides for a bus interface unit which constructs a data path between a Central Processor Unit and a system bus that can be fully contained within a programmable device.

Additionally, the system provides the enablement of compatibility with a processor working in the 28 to 32 MHz range and a system bus operating at 16 MHz. The data path is designed without the use of discrete RAMs. A set of internal tri-state bus capabilities are used for multiplexing a data queue in order to meet the timing requirements between the system bus and the processor. A translator logic box is implemented with an on-chip RAM so that the entire data path between the processor and the system bus is implemented by a single programmable device which then eliminates the need from intermodule connection crossings which can cause time delays, glitches and faulty interconnections.

DESCRIPTION OF PREFERRED EMBODIMENT

Figure 1:
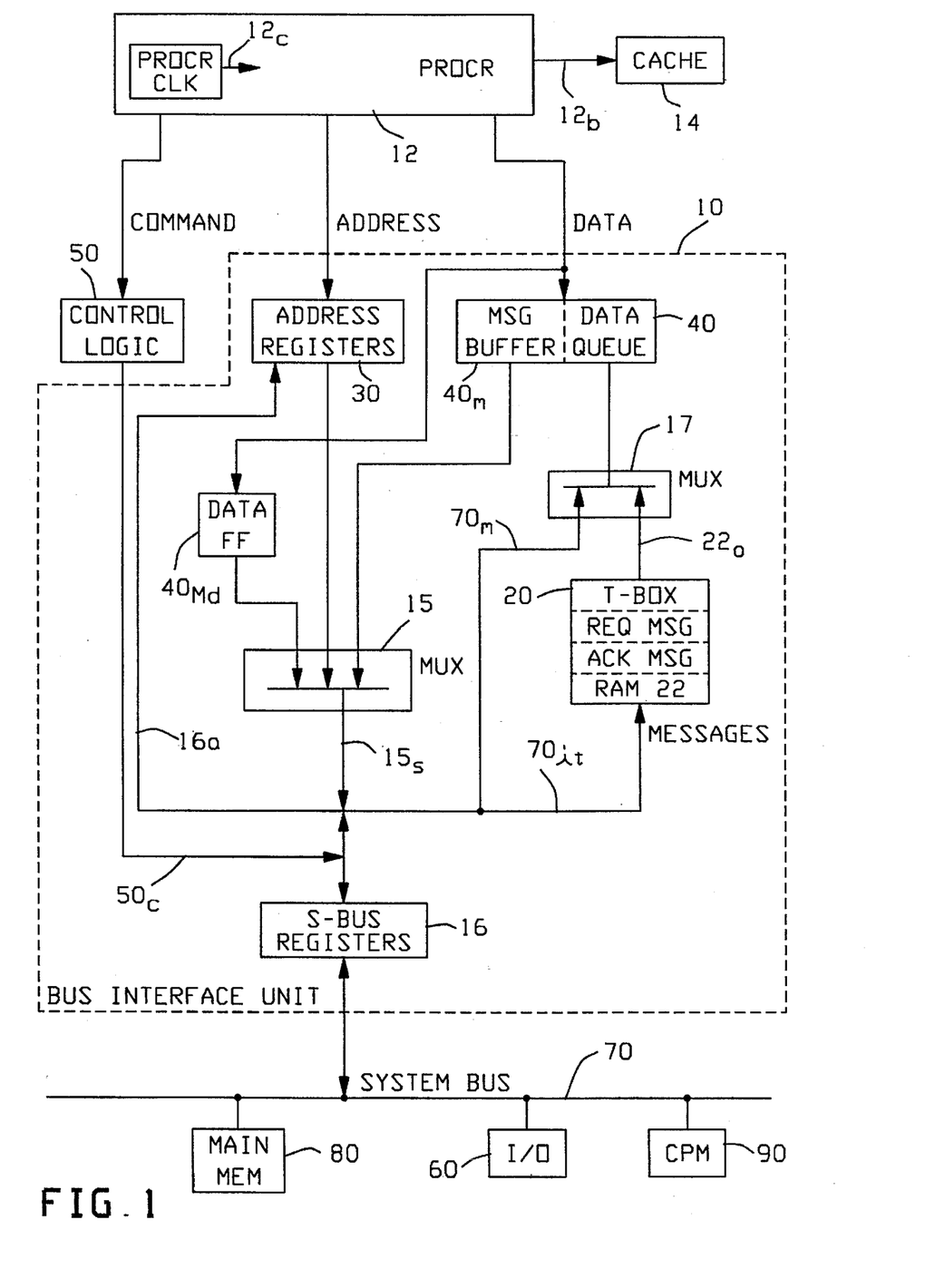
FIG. 1 is a general block diagram of a computer system having a central processor which is connected to a bus interface unit that provides a data path to the system bus to provide address, data, and message transfers between the processor and the system bus.

FIG. 1 is a generalized block diagram of a Central Processing Module (CPM) 8 having a processor 12 operating on a processor clock $12_c$ and connected to a cache unit 14, is interfaced by a single integrated Bus Interface Unit (BIU) Programmable Logic Array (PLA) which interface unit provides a specialized data path to and from a system bus 70.

The system bus 70 connects the computer system to other modules such as the I/O unit 60 and the main memory 80.

Commands from the processor 12 in FIG. 1 are fed through a control logic unit 50, which regulates the operation of the other units in the Bus Interface Unit, 10, which include the Address Registers 30, the Multiplexer 15, the system bus registers 16, the Message Buffer 40M, the Data Queue 40, and the Translation Logic Box 20 (T-Box).

The processor 12 can provide addresses to the Address Registers 30 and data to the Data Flip-flop $40M_d$ which can then be selected for transmittal to the system bus 70, which can then be used to send data to the main memory 80. This constitutes a Write operation seen in FIG. 5. The processor 12 can provide addresses to the Address Register 30 which can then be selected through multiplexer 15 for transmittal to the system bus 70, which can then be used to request data from the main memory 80, for later return to the data queue 40, for later transmittal to the processor 12. This constitutes a Read Request operation as seen in FIG. 6.

Messages which the processor 12 wishes to transmit to the system bus 70 can be placed in a message buffer 40M and selected through the multiplexer 15 for transmission to the System Bus Registers 16, after which the messages can be placed on the system bus 70 for delivery to the I/O unit 60 or other units which may reside on the bus 70.

Messages addressed to processor 12 on the system bus 70 can be selected for transmittal to the processor 12 by placing them in the System Bus Register 16 and then feeding them to the Translator Box 20 for subsequent passage through multiplexer 17 to the Data Queue 40. After this, the Data Queue 40 can pass the messages to the processor 12.

The overall structure of FIG. 1 may reside in a Central Processing Module board (CPM) 8 which contains the processor 12 and a bus interface unit BIU 10. The BIU or Bus Interface Unit 10, provides a single unit interface between the processor 12 and the system bus 70. The bus 70 is shared by other modules or boards. The system bus 70 carries address and data to and from the main memory 80 and also carries messages between any units on the bus 70.

The processor 12 accesses memory 80 by providing a command and address. Thus, the processor 12 can provide a command to the control logic 50 and an address to the Address Registers 30 of FIG. 1. The processor 12 can write one word or it can read one, two or four words, or Read, then Write one location of memory. The Bus Interface Unit 10 must decode the commands from the processor 12, hold the address in the Address Registers 30 and hold the data in the Data Flip-Flop $40M_d$ (FIG. 2) if the processor operation is a "Write" operation, and then further request the system bus 70 to deliver the request to the main memory 80. The data path through the Bus Interface Unit 10 must handle flow from the processor 12 to system bus 70 by providing the address, the command and the data. The data path also handles the flow of information from the system bus 70 to the processor 12, when the main memory 80 is returning data back.

The type of communication that occurs between the processor 12 and the I/O Unit 60, or any unit on bus 70 is via a protocol using "four-word" messages. Both the Central Processing Module 8 and the I/O Module 60 can issue a "Request Message" which expects a reply to be given. Both the processor 12 and the I/O Module 60 can reply to a request message by issuing an "Acknowledge Message" in response to the Request Message.

When the processor 12 has a message to send out, it passes the message on to the BIU 10 on the basis of "one word" at a time. The Bus Interface Unit 10 then collects the four message words in Message Buffer 40M and then will request the system bus 70 for access when the processor issues a command, to send the message via the control logic 50.

A message which is being sent to the processor 12 is collected in a specialized unit called a Translator Box 20. The Translator Box or T-box 20 is a RAM structure which stores 8 message words. Both types of messages, that is to say: (i) Request Messages, and (ii) Acknowledge Messages, are collected there in the T-box 20. The BIU 10 informs the processor 12 when there is a message to be read. At this time, the processor 12 will issue a command to read the message on the basis of "one word" at a time which is the protocol of the processor operation. However, the processor may be working at a much higher frequency rate, such as 32 MHz, while the system bus was operating only at a 16 MHz rate.

The processor 12 in the CPM 8 board also contains a cache unit 14. The cache provides local and readily accessible copies of data from memory 80 which can be accessed very quickly by the processor 12. Because a particular Central Processing Module is not the only module which can "Write" to the memory 80, the CPM must also have knowledge of which addresses are written to memory by any of the other modules such as the I/O Module 60. Thus, the processor's copy of memory must be kept current and there must be coherency between the cache memory 14 and the main memory 80. The Bus Interface Unit 10 must also provide the address of these "Write" operations to the processor 12. These addresses are called invalidation addresses. The Bus Interface Unit also passes invalidation addresses from the system bus 70 to the processor 12 in order to invalidate any words or data in the cache memory which are no longer valid. Thus, if the processor 12 finds data for a particular given address in the cache, the processor will mark that particular address invalid so that it cannot be used.

With the use of higher speed processors which operate at much higher speeds than that of the system bus and with the increased cost and performance requirements, a special need arose for a bus interface unit providing a data path that would meet certain of the following constraints:

(a) The data path had to be able to handle different clock rates that operated between the system bus 70 and the processor bus $12_b$;

(b) The data path had to handle a processor with a higher clock frequency and a higher throughout than previous systems having system busses connected to main memory, Input/Output modules or other digital modules;

(c) The data path had to maintain compatibility between the system bus protocol and the processor protocol which were different, since the processor operated to handle one word at a time, while the system bus would often handle a protocol of four words at a time, and the overall system performance had to be considerably enhanced in addition to being flexible, reliable and cost-effective.

As discussed earlier, other bus interface data path systems contain a combination of programmable devices and discreet RAMs. However, the difficulties that arose involve reliability and performance due to the inherently large number of board crossings and consequent delays between these devices.

A signal routed within a programmable device is a very reliable signal. When a signal is routed between two devices on a printed circuit board, three conditions are added where reliability may be reduced. These include:

(a) The connection from the source device to the PC board may lead to open connections which can arise over time due to the handling of the board, due to poor solder joints and so on.

(b) The routing on the printed circuit board may be exposed, increasing the potential of damage by handling, contact with foreign objects and so on. Further, signals routed on the board are exposed to potential noise pickup problems.

(c) The connection from the PC board to the destination device may present the same problems as in item (a) where open connections can take place.

In terms of performance, signals routed within a programmable device generally are much faster than signals routed between devices in different modules. The delay to get on-to and-off of a device, as well as the board routing delays, often requires the design to add "staging registers" which add more clock cycles to the time to enable signals to make it through the various devices. This in most case reduces the overall system performance.

And, again the alternative methods that were often used involved designing a customized Application Specific Integrated circuit, but this was often found to be less cost effective, since there was a much longer design cycle time, a higher risk of problems and less flexibility of changing the functioning conditions of the data path.

The present system for the data path flexibility and cost-effectiveness was enabled by the implementation of the Translator box or "T-box" which traditionally had existed in discrete RAMs and is now implemented by using the on-chip RAM contained within the programmable device. This was found to be most cost effective for maintaining flexibility as well as increasing the reliability of this system by reducing the board crossings. By using programmable devices with multiple clocks, this enables a simplification of the asynchronous interfaces between the system bus and the processor bus. Further, the use of internal tri-state bus capabilities within the programmable device for multiplexing a data queue, provided a unique feature which allowed enhancement of overall system performance. Thus the data path was implemented with two bit-sliced programmable devices, which allowed for a low part count and reduced the board crossings necessary. This also had an effect on providing an improved system reliability.

Figure 2:
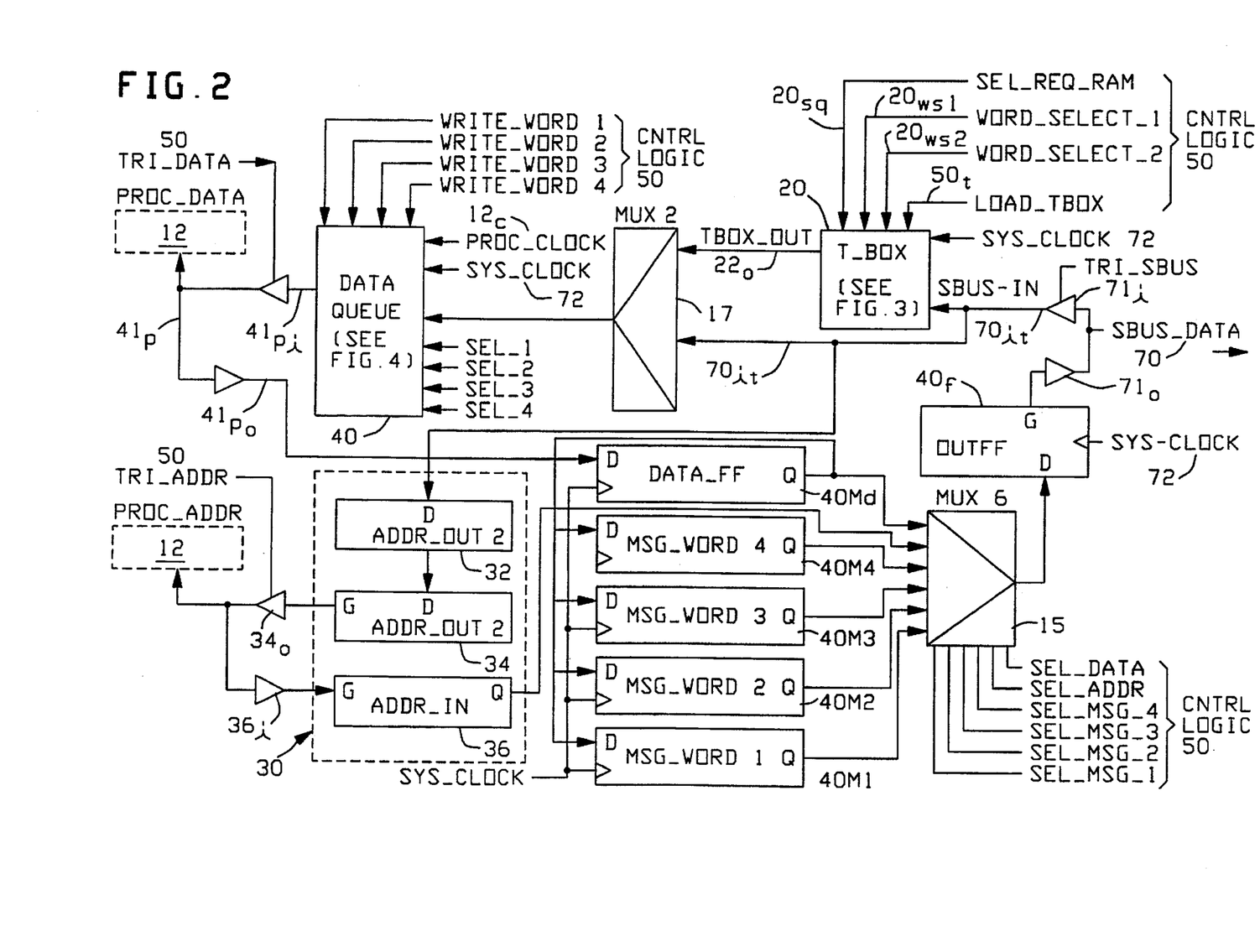
FIG. 2 is a more detailed block diagram of the data path implementation.

FIG. 2 shows a block diagram of the implementation of the data path. The data path is set to provide a means to pass data, addresses, and messages between the processor 12 and the memory 80, the I/O module 60 or other external modules 90. If the processor 12 makes a request to read four words from the main memory 80, it issues a command "Read Four" and also provides the address of the memory involved. This address is stored in the address registers 30 (32,34,36) of FIG. 2. The BIU control logic 50 will determine if the command is a "Read," which requires the address to go out on the system bus 70 and thus, the select address line 15sa, FIG. 2, will be set true for the multiplexer 15 of FIG. 2. The output flip-flop register $40_f$ will hold the address until the control logic 50 obtains control of the system bus 70 and can thus then drive the system bus 70.

The bus interface unit control logic 50 (FIG. 1) prepares for the returning data from memory 80 by selecting the system bus input line $70_i$ to the multiplexer 17 of FIG. 2. The main memory 80 returns four words of data during four consecutive clock times which are marked by a data valid signal on the system bus 70. The control logic 50 will use the data valid signals to activate the signals in FIG. 2 designated to activate the "Write" word one, two, three, four, signals that control the loading of the Data Queue 40.

The Reading of the Data Queue 40 is done using the clock signal using the system bus clock 72. The control logic 50 is used to select data words read from the queue 40 and uses the same clock as the processor which is the processor clock signal $12_c$. The queue select Lines of FIG. 2 designated SEL 1, 2, 3, 4, are activated by the control logic 50 which provides a Read data valid signal to go along with each word selected and driven over to the processor 12 on line $41_{pi}$.

There are two types of interprocessor communications which the bus interface unit (BIU) must monitor on the system bus. These include the "Acknowledge" messages and the "Request" messages. Thus, in the system, the bus interface unit control logic 50 monitors the system bus 70 looking for messages for the central processing unit 12.

Figure 3:
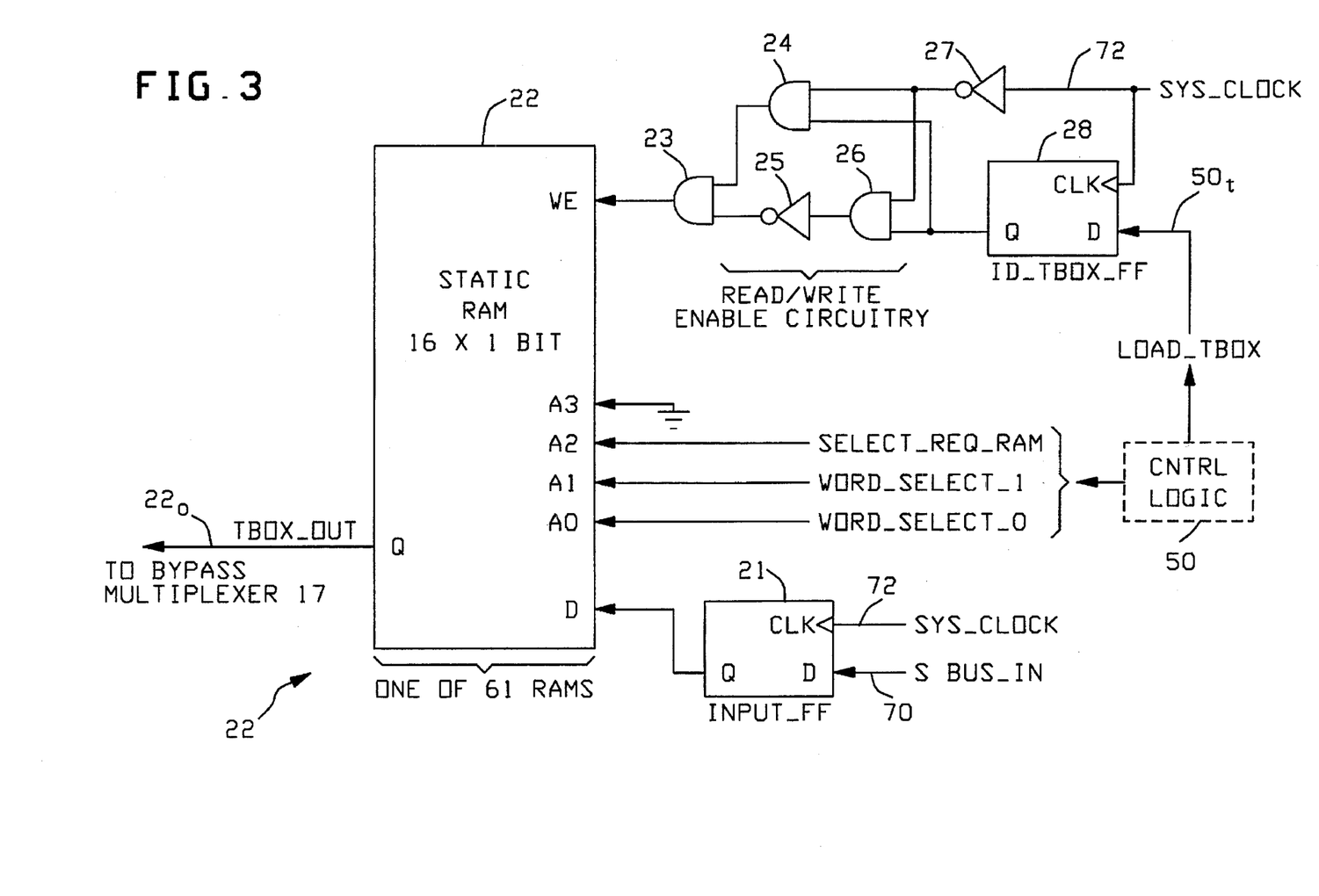
FIG. 3 is a drawing of the implementation for the translation logic box or T-box unit.

The system bus protocol dictates that these messages be sent as a group of four words. These four words arrive on the system bus 70 in succeeding order one after the next as a group. The processor 12 may not be able to receive these messages at the same time as they appear on the system bus 70 so they must be stored in the Bus Interface Unit until the processor 12 is able to read them. The holding function provided in the system is developed by the T-box of FIG. 3, designated as the Translator Box 20. (FIG. 2 and FIG. 3)

The four Request locations are four of the locations in the static RAM 22 (FIG. 3) of the T-box where the four words of the Request message are stored until the processor 12 can read them. Request commands include requests by other units on the system bus for the processor to execute operations, such as to change the stack and to run continuation operators.

The four "Acknowledge" locations are four other different locations in the static RAM 22, (FIG. 3 of the T-box 20) where the four words of an "Acknowledge" message are stored until the processor can read them. These messages are used to inform the processor 12 that another unit on the system bus 70 has received (acknowledged) a request made by the processor 12.

It may be noted that the bus interface unit (BIU) 10 must be able to store both a Request message and an Acknowledge message at the same time, thus a minimum of eight T-box locations in T-Box 20 are required to accomplish this.

When a message command is seen on the system bus 70, which is addressed to the CPM or processor 12, the control logic 50 will allow the four message words to be driven up through the system bus in line $70_{it}$ of FIG. 2 and will also activate the loading of the translator box 20.

The first message word contains a field indicating the type of message that it is, that is to say: (i) a Request message, or (ii) an Acknowledge message. This determines if the select request RAM signal $20_{sq}$ (FIG. 2) is activated and which selects addresses 0–3 or 4–7 for placement of the four words in the Translator Box 20. Each message word is marked with a data valid signal on the system bus 70.

The control logic 50 uses the data valid signal to activate word select 1 or word select 2 ($20_{ws1}$, $20_{ws2}$) to provide an address for writing into the Translator Box 20. When the last word is written into the Translator Box 20, the processor 12 is signaled indicating a message is waiting to be read. Then the processor will read the message one word at a time, that is to say, the processor protocol operates on a Read operation of one word at time basis, unlike the system bus which transfers four words at a time. The processor 12 will then issue four separate requests to read a message indicating the message type that it was—that is to say, an Acknowledged message or a Request message. The control logic 50 will select the T-box out signal $22_o$ and send it through the multiplexer 17 and then increment the address for the Translator Box 20 for each Read request. The message is passed then on to the Data Queue 40 to be stored and then read by the processor 12 by means of the output line $40_{pi}$. In this case, the data is a message word and only one address location of the queue 40 is needed.

FIG. 3 is a diagram showing how an on-chip static RAM is contained within the programmable device and is utilized to implement the T-box structure. While FIG. 3 shows only one (16X1 bit) RAM as an example, there are 61 of these RAMs for storing each one of the four 61-bit Request words and each one of the 61-bit Acknowledge words. A typical useable programmable device is the Xilinx 4010 manufactured by the Xilinx Corporation of San Jose, Calif.

Incoming data from system bus 70 is latched on to a delay flip-flop 21 of FIG. 3 and clocked with the system clock 72. The output of the input flip-flop 21 of FIG. 3 is routed to the data input line of the static RAM 22. The input terminal A2 of the select request RAM line selects whether to map the data input to the four Request locations or the four Acknowledge locations.

The input terminal signals AO, A1, for word select 0 and word select 1 are used to select which one of these four-word locations the data is written to or the data is read from. Although 16-word RAM locations are available in the programmable device, only 8 locations are required in this situation, that is for four Request messages and four Acknowledge messages. Thus, the terminal line A3 can be tied to ground.

The control signal load T-box on line $50_t$ of FIG. 3 is latched into a delay flip-flop 28 which is clocked with the system clock 72. The output of the delay flip-flop 28 is gated together with the system clock 72 in order to create a write enable pulse for the RAM 22 at the terminal marked WE (Write Enable). The output of the RAM 22 is provided on line 220 and the output of the RAM is its memory contents whenever the signal WE is "inactive", and when the terminal WE is "active", then there is an input placed into the RAM 22.

AND gate 24 receives inputs from inverter 27 (carrying system clock 72) and from the load T-box flip-flop 28. AND gate 26 receives inputs from inverter 27 and load flip-flop 28. The output of AND gate 26 is inverted by inverter 25 and fed to one input of AND gate 23. The output of AND gate 24 is fed to the second input of AND gate 23 which provides signals to the WE (Write Enable) terminal of RAM 22.

The RAM output $22_o$ is routed to the data path bypass multiplexer 17 of FIG. 2. This methodology increases flexibility since the T-box is fully programmable. As a result of this, its size and function can be altered if operating requirements should change.

Keeping the T-box 20 (programmable device) on the same device 10 as the rest of the data path, adds reliability by thus avoiding the board crossings required when the use of discrete RAMs was used. The abundant RAM resources of the programmable device 20 allows for the T-box to be implemented using only a very low percentage of the total programmable device. This leaves many other registers and control terminals available for other implementations when requirements change.

For example, if the system requirements changed to where additional types of messages were needed to be stored, the T-box 20 could easily be expanded to accommodate this.

Figure 4:
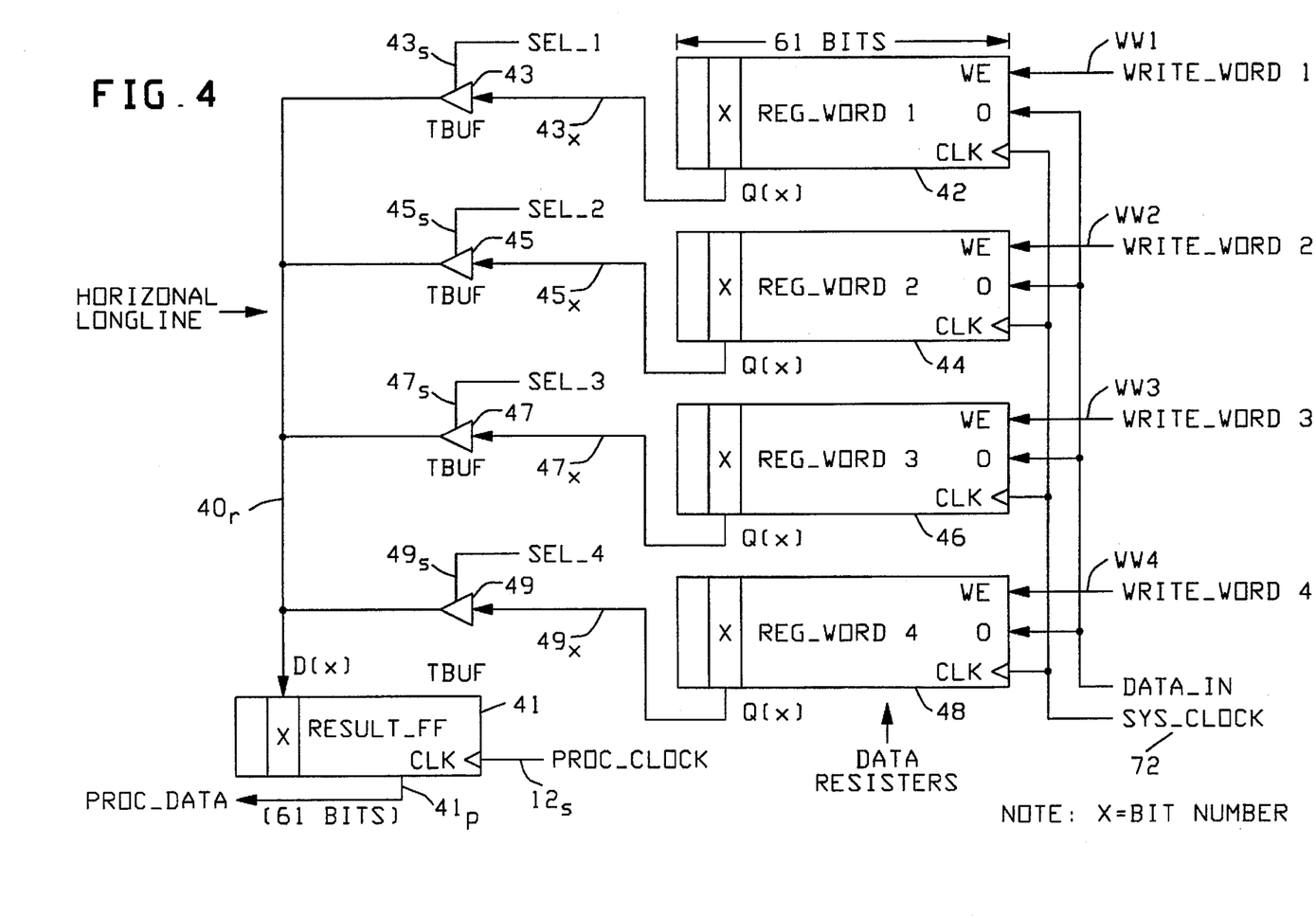
FIG. 4 is a block diagram showing the implementation of the data queue logic.

FIG. 4 is a drawing illustrating how the use of internal tri-stated busses in the programmable device 22 are utilized to implement a Data Queue at the asynchronous interface between the processor clock $12_c$ and the system clock 72 areas of the circuitry. Thus, while the system clock 72 may operate at 16 MHz, the processor clock would be operating at a 32 Mhz rate.

In FIG. 4, the Data Queue 40 has inputs which feed four registers 42, 44, 46, and 48, each of which is 61 bits wide. This provides one register for each of the four data words. This data input, as well as the Write enable line signals WW1, WW2, WW3, WW4, for these registers, are synchronous with the system clock 72. These data word registers are clocked with the system clock signal 72.

The output of a bit slice, bit "x," from each of the four data word register locations, are routed to the inputs of internal tri-state buffers, shown in FIG. 4 as 43, 45, 47 and 49. The control inputs $43_x$, $45_x$, $47_x$, and $49_x$ to these tri-state buffers are controlled by word select lines which are synchronous with the processor clock $12_c$.

The word select lines in FIG. 4 shown as $43_s$, $45_s$, $47_s$ and $49_s$ are mutually exclusive by design with the select line for the word one select, this word one select line being the default.

The current set of "default" involves the situation such that if the word select lines $45_s$, $47_s$, and $49_s$ are all inactive (thus not enabling buffers 45, 47 or 49) then the word select line $43_s$ is driven "active" to enable the buffer 43 as the default enabled buffer.

The outputs of all four buffers 43, 45, 47 and 49 are then routed to one "horizontal long line" routing resource $40_r$ as well as the input of a delay flip-flop It will be seen that the result flip-flop 41 of FIG. 4 is clocked with the processor clock signal $12_c$.

This approach implements the functionality of an output multiplexer which is a virtual module which is provided by the tri-state buffers which drive unto the horizontal long lines of FIG. 4. Thus, the method of using the tri-state buffers provides the same functionality as a conventional multiplexer which in FIG. 4 would be represented by the buffers 43, 45, 47, 49, plus the select lines 1, 2, 3, 4 which are designated $43_s$, $45_s$, $47_s$, and $49_s$. The input lines involved are $43_x$, $45_x$, $47_x$, and $49_x$. The output is the horizontal long line designated $40_r$. Through this the data queue 40 of FIG. 1 provides a multiplexing action without consuming any logic blocks within the programmable device, a block diagram of which is indicated in FIG. 2.

The elements in FIG. 3 are all contained in the T-box 20 of FIG. 2. All the elements in FIG. 4 are contained in the data queue box 40 of FIG. 2. Thus, all of the modules shown in FIGS. 3 and 4 are also contained in the programmable logic device shown in FIG. 2. The use of such a programmable device saves resources and eliminates logic block timing delays between separate units on a PC board.

By this design, the data in the data registers 42, 44, 46, and 48 of FIG. 4 is assured to be stable at the time the data is latched into the result flip-flop 41. This would not be the case if interconnections required that the registers and the output multiplexer and the result flip-flop were on separate devices that required interconnecting lines.

Thus, by not consuming logic blocks within the programmable device, and also eliminating logic block timing delays, the design method involved here provides for a stable asynchronous interface which is void of metastability problems.

Figure 5:
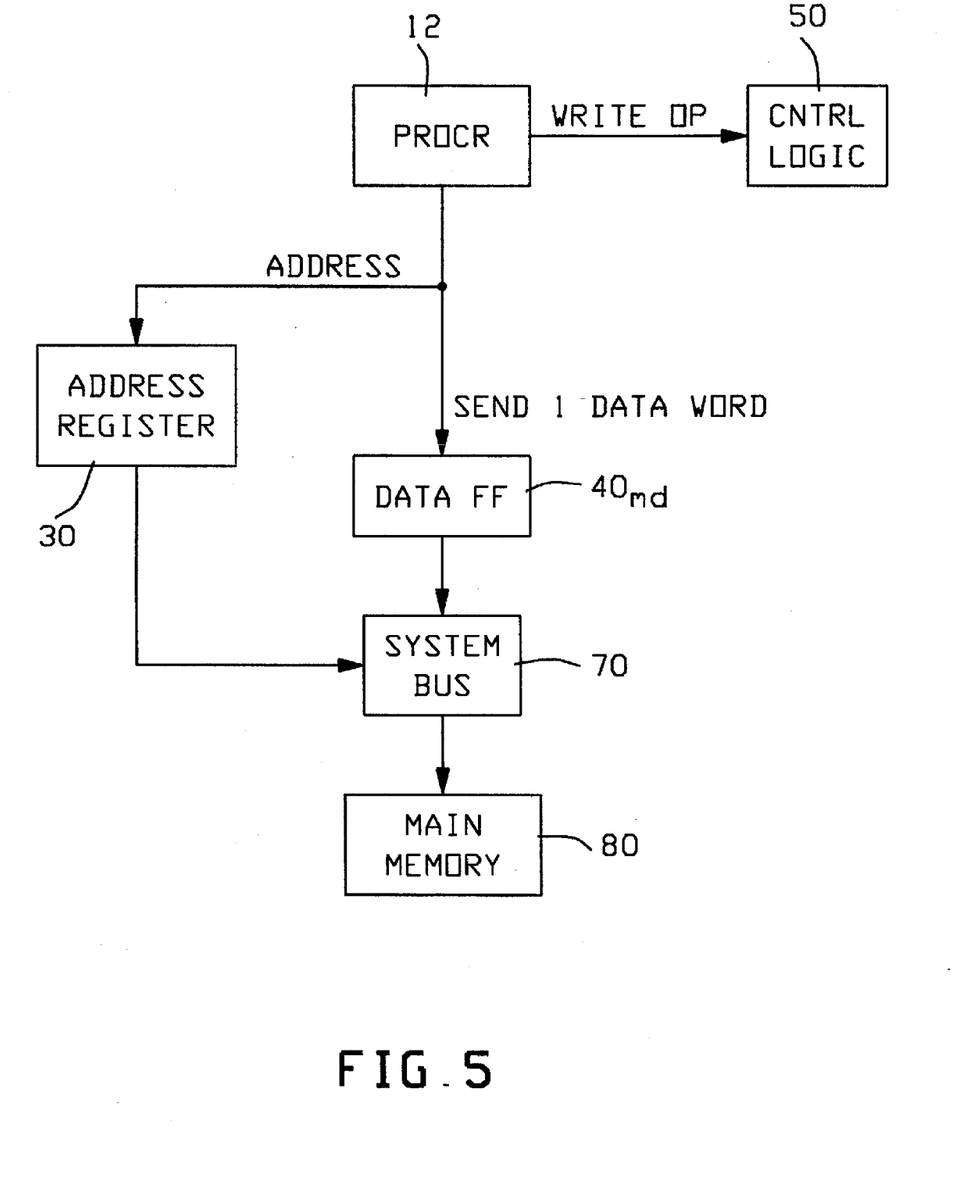
FIG. 5 is a flow diagram illustrating the sequence for the processor to write one word to main memory.
Figure 6:
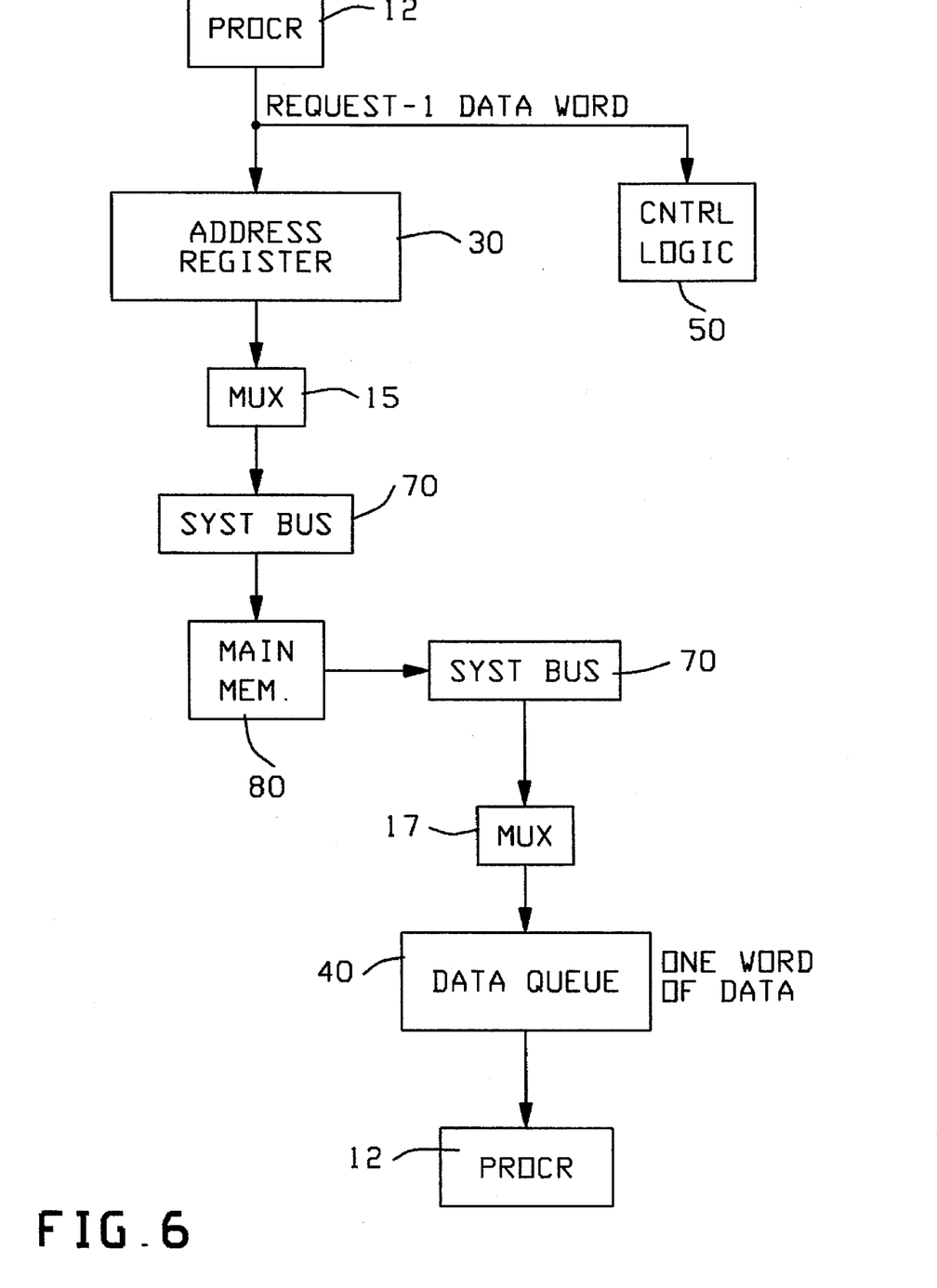
FIG. 6 is a flow diagram illustrating the action of the processor requesting one data word from main memory.

FIG. 5 is a flow chart illustrating the transfer of data from the processor to main memory. This can be a Write operation where the processor sends one word of data.

In FIG. 5, processor 12 will provide an address to the address register 30 and a data word to the data flip-flop $40M_d$.

Under control of the control logic 50, the address register 30 will first provide the address on to the system bus 70 and then enable the data flip-flop $40M_d$ to provide the data word onto the system bus 70. The system bus 70 will then carry first the address, then the data for writing into the main memory module 80.

FIG. 6 is a flow chart illustrating the steps for the processor to request one word to be Read from main memory.

In FIG. 6, the processor will send a command to the control logic 50 to request one word of data to be Read from the main memory.

The processor will send the address of the requested word to the address register 30 which will pass it through the multiplexer 15 over to the system bus 70 which will then pass the address of the one word into the main memory 80.

The main memory 80 will read out the desired word that was addressed and pass it one to the system bus 70. Then this single words is passed on the system bus 70 over to the multiplexer 17 and then into the data queue 40 and into the register for word one, register 42 of FIG. 4.

At this time the control logic 50 will notify the processor that the word is available in the data queue 40 after which the processor can access the requested data word.

Figure 7:
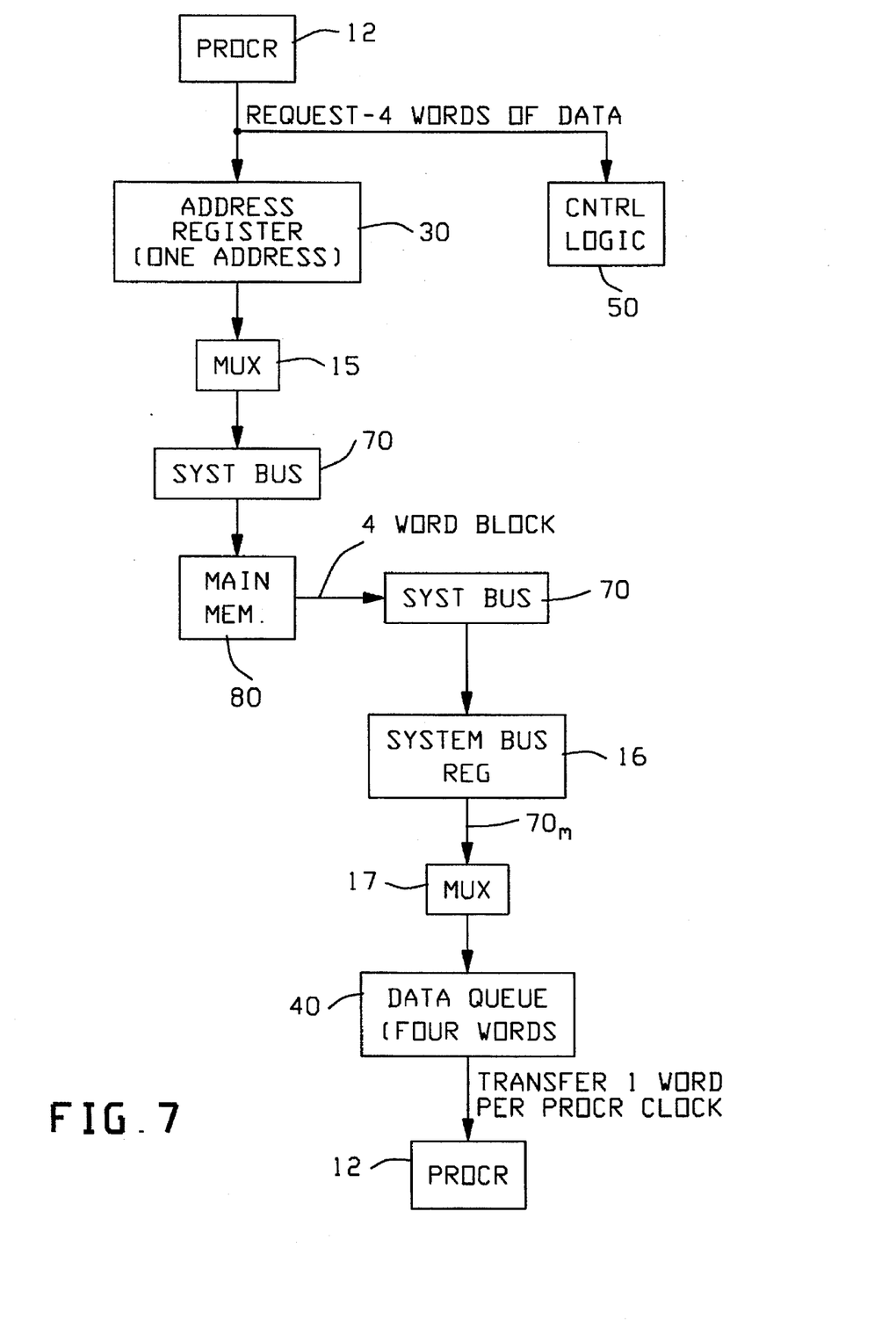
FIG. 7 is a diagram showing the sequence for the processor requesting a block of four words from main memory.

FIG. 7 is a flow chart illustrating the system flow where the processor requests four words of data as a block of data.

In FIG. 7, the processor 12 will send the command request for four words of data to the control logic 50. The processor 12 will also send one address only to the address register 30 which address will cover the entire block of four words.

The address in the address register 30 is fed through the multiplexer 15 over to the system bus 70 and the command and address is sent to the main memory 80.

The main memory 80 will access four words in a block for transmittal on the system bus 70 to the SBUS register 16 which connects to the multiplexer 17 and places the four words in the data queue 40 which will fill up the four registers in the data queue.

Subsequently, the control logic 50 will notify the processor that the data queue has data words available so that the processor can then access one word at a time, that is to say, one word per processor clock from the data queue 40. The control logic places the first word on the data bus to the processor and notifies the processor it is there. The processor takes the data and tells the control logic 50, then the control logic 50 re, eats the process for each of the three remaining words.

Figure 8:
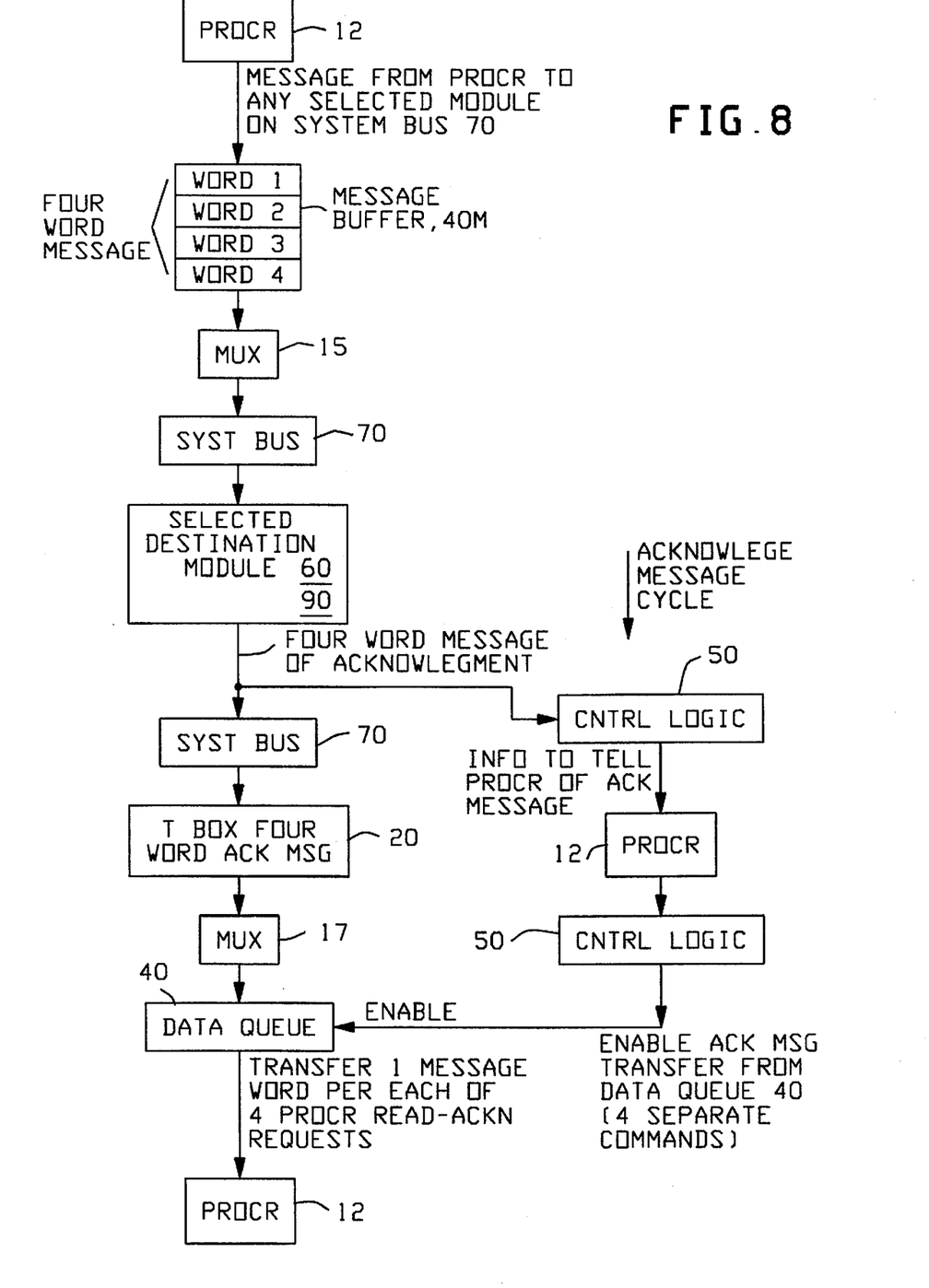
FIG. 8 illustrates the intermodule communication function where the processor sends a four-word message to a selected module on the system bus and receives an acknowledge message.

In contrast to the passing of data for Read or Write operations, there is an inter-communication system whereby messages are passed between various modules in the system. This is done by the use of message words. FIG. 8 is a flow chart illustrating the transfer of message words for purposes of intermodule communication.

In the flow chart of FIG. 8, the processor 12 can generate a message to any module on the bus 70. This message will consist of four words of 61 bits each (54 plus 7 parity bits). These four words are sent to the message buffer 40M and will reside in the four register therein.

The message words in the message buffer 40M are transferred through the multiplexer 15 over to the system bus 70 which will transfer them to a destination module such as module 60 or module 90.

This type of message may be a command to go into an idle condition or to change stacks and operate on a different task than what the module was previously operating on.

After receipt of the message to the destination module, an acknowledgement cycle may take place whereby the destination module 60 or 90 will generate a four-word message of 61 bits each for each word and transit this to the system bus 70. The system bus 70 will transmit these four words to the transfer logic box 20 in order to form a four-word acknowledgement message.

At this stage, the control logic 50 will inform the processor 12 that a message is waiting for Then the processor 12 will generate four command requests, (one for each word) to Read the message words, at which time, one word at a time of the four-word message is passed through the multiplexer 17 to the Data Queue and then to the processor at the processor clock rate.

Figure 9:
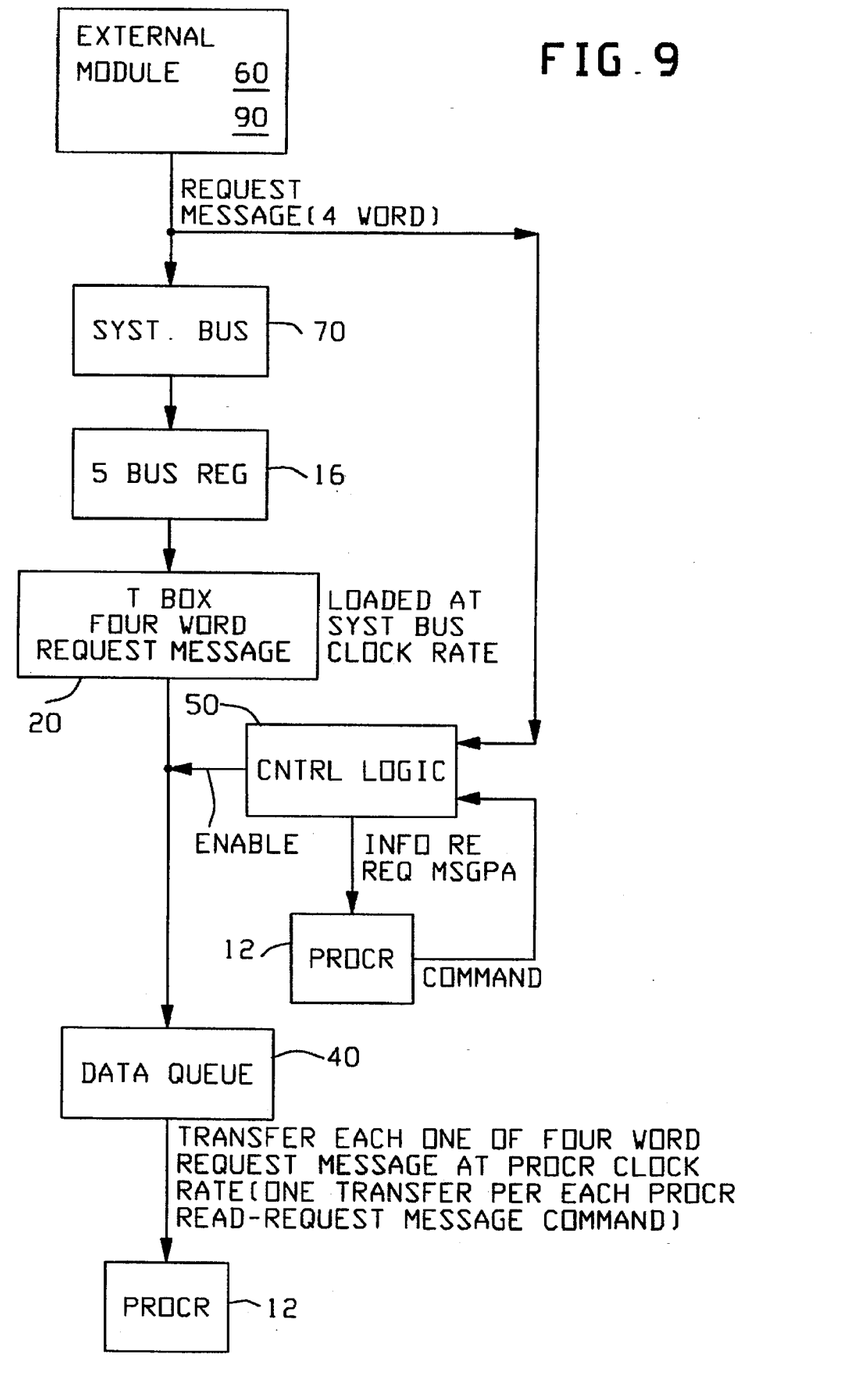
FIG. 9 shows the operational sequence when an external module on the system bus transmits a four-word Request message to the processor.

Another example of a message transfer is shown in FIG. 9. FIG. 9 indicates a external module on a system bus, such as I/O module 60 sending a request to the processor 12.

As seen on FIG. 9, the I/O module 60 will generate a "Request" to the processor which will constitute a four-word message where each word is composed of 61 bits. The four-word message block is conveyed to the system bus 70 and then to the transfer logic box 20 and placed in the request portion for temporary storage of the four words.

At this stage, the control logic 50 will signal the processor of the request message residing in the transfer logic box.

The processor 12 will then command the control logic to pass one message word in the T-box 20 over to the data queue 20 which will then pass, the one word to the processor at the processor clock rate.

This is repeated three more times so that each one of the four message words of request are transferred to the processor 12.

Figure 10:
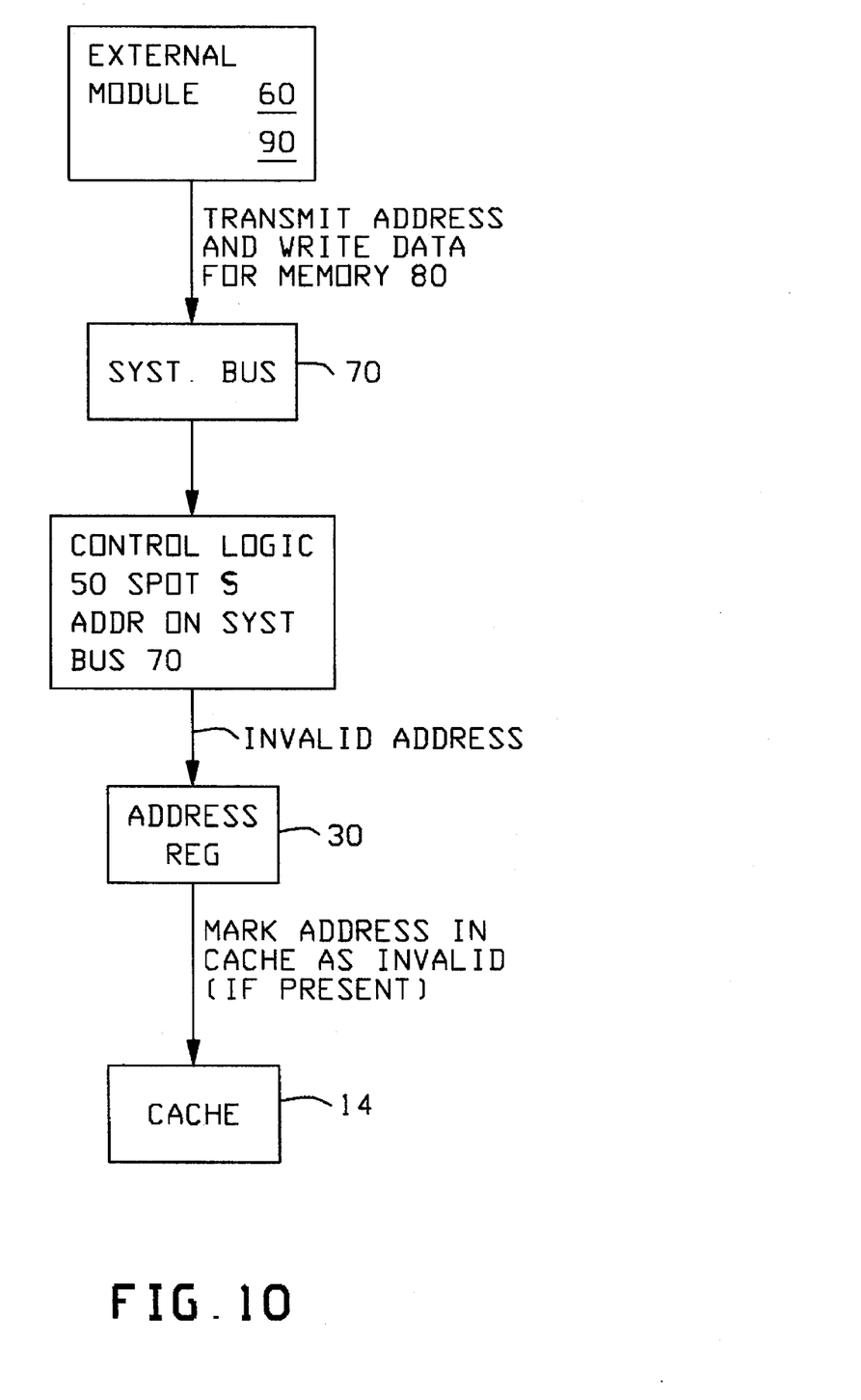
FIG. 10 shows the operational sequence where the control logic gathers Write operation addresses from the system bus for use in invalidating a matching address in cache memory.

FIG. 10 is a flow chart indicating the transfer of information which is used for an invalidation cycle to the processor and its cache memory.

For example, the I/O module 60 is sending a Write operator to the main memory to insert new data. This means that the present data in the cache memory 14 would no longer be valid but the cache memory does not yet reflect this.

The address on the system bus 70 is monitored by the control logic 50 which has a spy module. The spy module spots the address in order to institute an invalidation cycle to invalidate this address should this address reside in the cache memory 14. The address from the system bus 70 is conveyed to the address register 30 and then conveyed, upon operation of the control logic 50, to the cache memory 14.

Described here has been a bus interface unit data path system implemented on a field programmable gate array which eliminates the device crossings formerly required, thus providing higher reliability and timing stability which heretofore posed operational problems.

While one implementation of the data path interface system has been shown, other possible architectures may still be used but which use the concepts defined in the following claims.

What is claimed is:

1. An integrated field programmable gate array data path interface system for data transfer between a processor operating at a processor clock rate and a system bus means operating at a system bus clock rate comprising:

(a) means to transfer N words of protocol message from said processor to a message buffer means at said processor clock rate;
  (b) means to transfer said N word protocol messages in groups of N words to said system bus means at said system bus clock rate;
  (c) means to transfer N message words of data from said system bus means to a transfer logic box means at said system bus clock rate;
  (d) means to transfer data words from said main memory of said system bus means to said data queue means;
  (e) means to transfer each word of said N message words of protocol data to said processor at said processor clock rate;
  (f) said transfer logic box means for holding a message of N words.

2. The system of claim 1 wherein said transfer logic box means includes:

(a) N word registers for holding Request messages from external digital modules on said system bus means for transmittal to said processor;
  (b) N word registers for holding N acknowledgement messages from said external digital modules, to said processor.

3. The system of claim 1 wherein said means to transfer each said message of said N words of data to said processor includes:

(a) data queue means holding N data words for transference to said processor at one word intervals at said processor clock rate, and for routing said message words to said processor.

4. A data path interface system embodied in a field programmable gate array, for data transfers between a processor operating on a first clock rate and first protocol, and a system bus operating on a second clock rate and second protocol, said interface system comprising:

(a) address register means for holding addresses of data being transferred from said process or to said system bus or from said system bus to said processor;
  (b) message buffer means for holding messages being transferred from said processor to said system bus, each said message including four words of "X" bits each;
  (c) data queue means for holding data received from main memory and for routing messages transferred from said system bus and destined for said processor, including:
    (c1) means to transfer single word messages to said processor at the said processor clock rate;

(c2) means to transfer single word, double word and four-word blocks of memory data to said processor at the processor clock rate;

(d) transfer logic box means for holding (i) N request messages to said processor and (ii) N acknowledge messages to said processor, including:

(d1) means to transfer to said processor, each one of said N request and N acknowledge messages to said data queue means one word at a time at the processor clock rate for subsequent transfer to said processor;

(e) control logic means regulating the transfer times of addresses, data, and messages flowing through said address registers, through said message buffer means, through said data queue means, and through said transfer logic box means;

(f) said system bus means operating at said second clock rate and second protocol for connecting said data path interface system to an external main memory, I/O module, and other external modules.

* * * * *